US006847169B2

(12) United States Patent
Ito et al.

(10) Patent No.: US 6,847,169 B2
(45) Date of Patent: Jan. 25, 2005

(54) LIGHTING CIRCUIT

(75) Inventors: Masayasu Ito, Shizuoka-ken (JP); Hiroki Ishibashi, Shizuoka-ken (JP); Kentaro Murakami, Shizuoka-ken (JP); Hitoshi Takeda, Shizuoka-ken (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/680,754

(22) Filed: Oct. 7, 2003

(65) Prior Publication Data

US 2004/0080273 A1 Apr. 29, 2004

(30) Foreign Application Priority Data

Oct. 8, 2002 (JP) ....................................... 2002-295486

(51) Int. Cl.[7] ................................................ B60Q 1/26

(52) U.S. Cl. ........................................... 315/77; 315/80

(58) Field of Search ............................. 315/77, 78, 80, 315/82, 224, 291, 307; 362/20, 183, 296

(56) References Cited

U.S. PATENT DOCUMENTS 6,191,541 B1 * 2/2001 Patel et al. ................... 315/77
6,286,976 B1 * 9/2001 Chopra et al. ................ 315/77
6,653,789 B2 * 11/2003 Roller et al. .................. 315/80

FOREIGN PATENT DOCUMENTS

JP 2001-215913 8/2001 ............ G09G/3/14

OTHER PUBLICATIONS

ESP@CENET Database 12, Japanese Patent No. JP2001215913, Publication date: Aug. 10, 2001, 1 page.

* cited by examiner

*Primary Examiner*—Wilson Lee
(74) *Attorney, Agent, or Firm*—Osha & May LLP

(57) ABSTRACT

A lighting circuit for lighting a vehicular lamp including a light-emitting diode, includes: a switching regulator for applying an output voltage based on a power-supply voltage received from a DC power supply provided in the outside thereof to the light-emitting diode so as to supply a supply current to the light-emitting diode; an abnormal state detector for detecting an abnormal state of the lighting circuit based on at least one of the output voltage of the switching regulator, the supply current and the power-supply voltage; and an output controlling unit for controlling the output voltage of the switching regulator based on the supply current or the output voltage of the switching regulator and lowering the output voltage of the switching regulator in a case where the abnormal state detector detected the abnormal state.

6 Claims, 9 Drawing Sheets

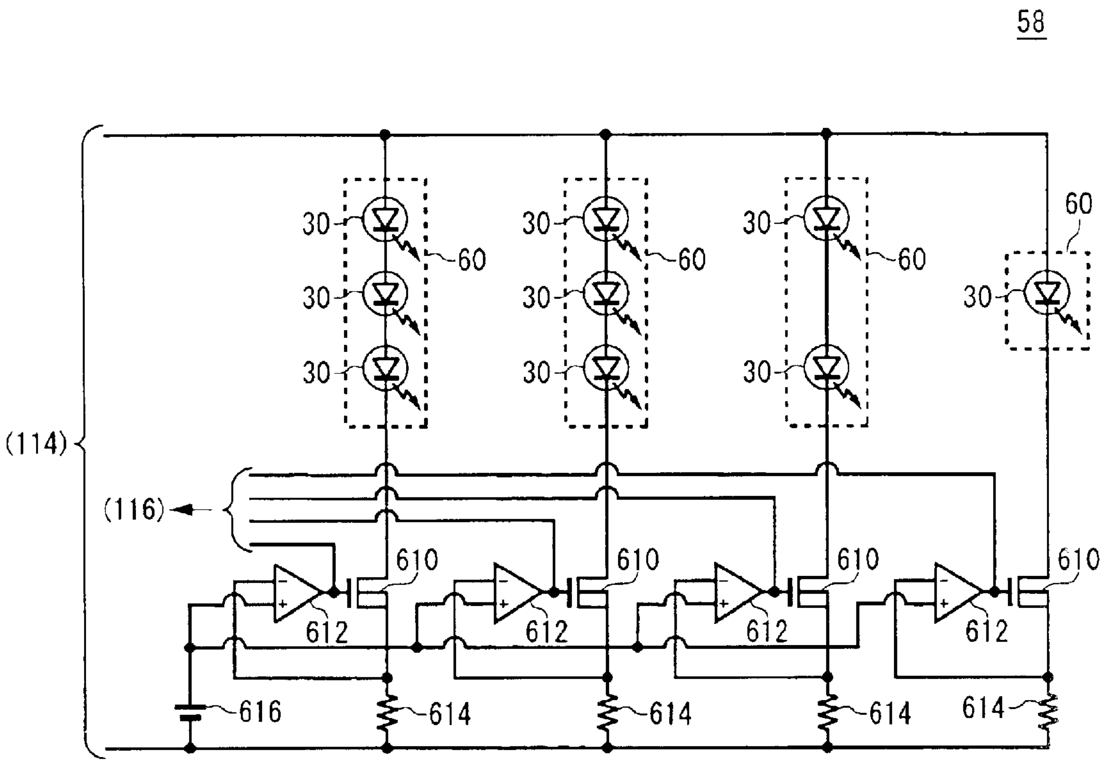
F/G. 8A
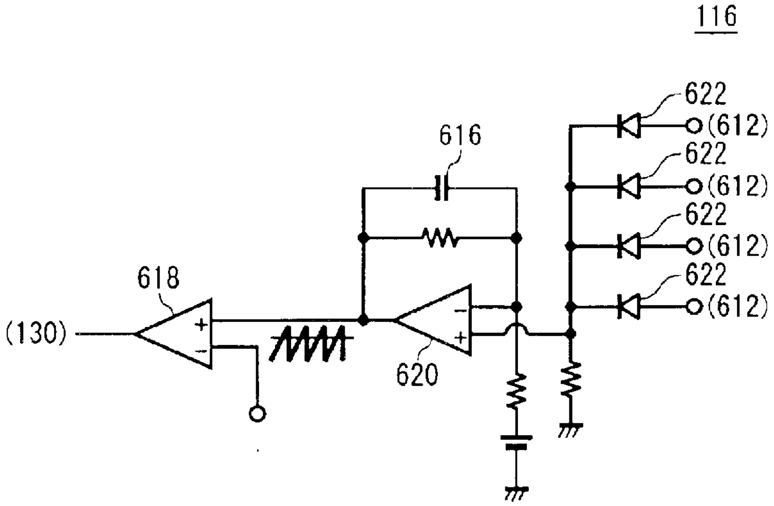
F/G. 8B

LIGHTING CIRCUIT

This patent application claims priority from a Japanese patent application No. 2002-295486 filed on Oct. 8, 2002, the contents of which are incorporated herein by reference.

BACKGROUND OF THE INVENTION

1. Field of the Invention

The present invention relates to a lighting circuit. More particularly, the present invention relates to a lighting circuit capable of lighting a vehicular lamp including a light-emitting diode.

2. Description of the Related Art

Conventionally, a switching regulator is known that supplies power to a light source of a vehicular lamp as disclosed, for example, in Japanese Patent Application Laid-Open No. 2001-215913, page 3, FIG. 7.

A vehicle carries high flammable fuel such as gasoline. Thus, the switching regulator mounted on the vehicle should have high safety.

However, in a case where the output of the switching regulator is short-circuited or earthen, for example, the load on the switching regulator increases. Therefore, the switching regulator may break down, emit smoke or generate heat because of burden of excess power.

Moreover, in a case where the output became open because of, for example, breaking, an output voltage may increase excessively in a flyback switching regulator, for example. This may lead to danger of electric shock to a user or risk of leak caused by the excessive high voltage, smoking or firing caused by discharge.

SUMMARY OF THE INVENTION

Therefore, it is an object of the present invention to provide a lighting circuit, which is capable of overcoming the above drawbacks accompanying the conventional art. The above and other objects can be achieved by combinations described in the independent claims. The dependent claims define further advantageous and exemplary combinations of the present invention.

According to the first aspect of the present invention, a lighting circuit for lighting a vehicular lamp including a light-emitting diode, comprises: a switching regulator operable to apply an output voltage based on a power-supply voltage received from a DC power supply provided in an outside thereof, to the light-emitting diode to supply a supply current to the light-emitting diode; an abnormal state detector operable to detect an abnormal state of the lighting circuit based on at least one of the output voltage of the switching regulator, the supply current and the power-supply voltage; and an output controlling unit operable to control the output voltage of the switching regulator based on the supply current or the output voltage of the switching regulator and to lower the output voltage of the switching regulator in a case where the abnormal state detector detected the abnormal state.

The vehicular lamp may include n light-emitting diodes connected in parallel, where n is integer equal to or larger than 2; the abnormal state detector may detect breaking of at least one of the n light-emitting diodes as the abnormal state; and the output controlling unit may lower the output voltage of the switching regulator in a case where the abnormal state detector detected the abnormal state, to reduce the supply current to approximately (n−1)/n times.

The output controlling unit may stop the switching regulator in a case where the abnormal state detector detected the abnormal state.

The abnormal state detector may detect that the output voltage of the switching regulator becomes higher than a predetermined voltage as the abnormal state.

The abnormal state detector may detect that the power-supply voltage changes to a voltage outside a predetermined region as the abnormal state, and the output controlling unit may stop the switching regulator in a case where the abnormal state was detected and resumes the switching regulator in a case where the detection of the abnormal state was stopped.

The lighting circuit may further comprise a smoothening capacitor operable to smoothen change of a voltage that is based on at least one of the output voltage of the switching regulator, the supply current and the power-supply voltage, wherein the abnormal state detector detects the abnormal state based on the smoothened voltage.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIG. 8A shows another exemplary circuit structure of the light source block 58.

FIG. 8B shows another exemplary circuit structure of the output controlling unit 116.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
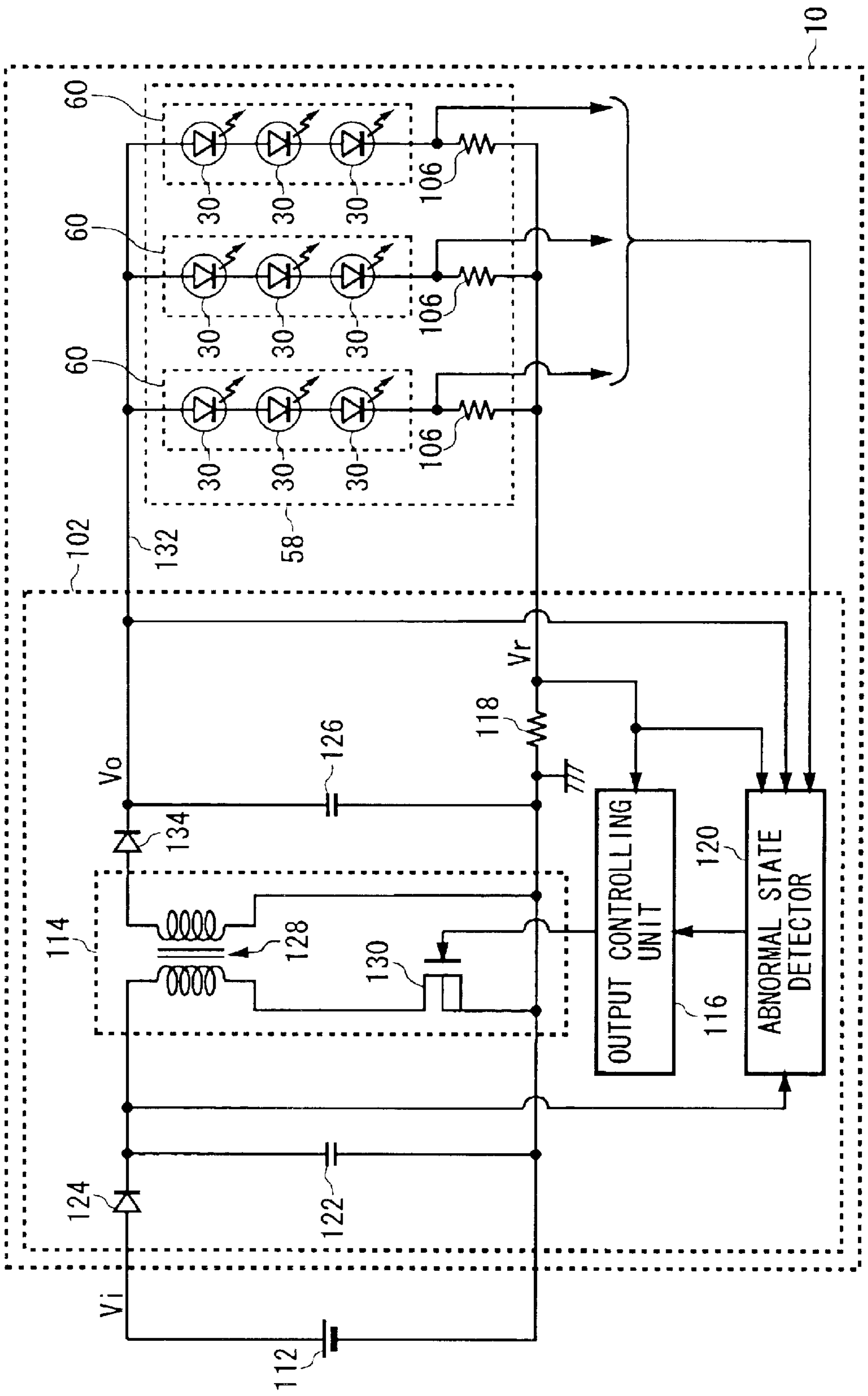
FIG. 1 shows an exemplary circuit structure of a vehicular lamp 10 according to an embodiment of the present invention.

FIG. 1 shows an exemplary circuit structure of a vehicular lamp 10 according to an embodiment of the present invention. The vehicular lamp 10 of this example can light light-emitting diodes 30 safely based on power received from a DC power supply 112 provided in the outside of the vehicular lamp 10, such as an automotive battery. The vehicular lamp 10 includes a light source block 58 and a lighting circuit 102.

The light source block 58 includes a plurality of light source units 60 connected in parallel and a plurality of resistors 106 connected in series with the associated light source units 60, respectively. The light source unit 60 includes one or more light-emitting diodes 30 connected in series. The resistor 106 generates a voltage across the resistor 106, that is based on a current flowing in the associated light source unit 60 in accordance with a supply current. Thus, in a case where any light-emitting diode 30 is broken in the associated light source unit 60, the voltage across the resistor 106 becomes lower.

The lighting circuit 102 includes a switching regulator 114, a resistor 118, an abnormal state detector 120, an output controlling unit 116, a capacitor 122, a capacitor 126, a diode 134 and a diode 124.

The switching regulator 114 includes an NMOS transistor 130 and a transformer 128. The NMOS transistor 130 is a switch that switches whether or not a power-supply voltage received from the DC power supply 112 is supplied to a primary coil of the transformer 128 by being connected to the primary coil of the transformer 128 in series.

The transformer 128 outputs an output voltage based on the power-supply voltage received at the primary coil, from a secondary coil. In this example, the transformer 128 outputs a positive voltage from a higher-voltage output end of the secondary coil by being grounded at a lower-voltage output end of the secondary coil. The switching regulator 114 applies the thus output positive voltage to a plurality of light-emitting diodes 30, thereby supplying the supply current to the light-emitting diodes 30 so as to light them.

Here, a case is considered where the supply current is generated by applying the power-supply voltage to the resistor connected to the light source block 58 in series. In this case, heat loss in that resistor becomes larger and power consumed by the vehicular lamp 10 also becomes larger. However, in this example, the switching regulator 114 generates the supply current. Thus, according to this example, the vehicular lamp 10 having high power efficiency can be provided.

In this example, the switching regulator 114 is a flyback regulator. In an alternative example, the switching regulator 114 may be a forward or step-down type. In addition, the switching regulator 114 may include a coil that supplies to the light source block 58 a current received from the DC power supply 112, in place of the transformer 128.

The resistor 118 is connected to the light source block 58 in series and generates a voltage-detection voltage, that is based on the supply current flowing in the light source block 58, across the resistor 118. The abnormal state detector 120 detects an abnormal state of the vehicular lamp 10 based on each of the output voltage of the switching regulator 114, information indicating the breaking of the light-emitting diode 30, the supply current and the power-supply voltage.

The output controlling unit 116 controls a duration ratio of a period in which the NMOS transistor 130 is on and a period in which the NMOS transistor 130 is off based on the voltage-detection voltage generated by the resistor 118. In this manner, the output controlling unit 116 controls the output voltage of the switching regulator 114 based on the supply current.

In a case where the abnormal state detector 120 has detected the abnormal state of the vehicular lamp 10, the output controlling unit 116 lowers the output voltage of the switching regulator 114. The output controlling unit 116 stops the switching regulator 114, for example. According to this example, it is possible to safely light the light-emitting diode 30.

Moreover, in a case where the vehicular lamp 10 includes n (n is integer equal to or larger than 2) light-emitting diodes 30 connected in parallel, the abnormal state detector 120 detects breaking of at least one of the n light-emitting diodes 30 as the abnormal state. When the abnormal state detector 120 detected that abnormal state, the output controlling unit 116 may reduce the supply current to approximately $(n-1)/n$ times by lowering the output voltage of the switching regulator 114. In this case, the vehicular lamp 10 can make the light-emitting diodes 30 emit light with appropriate brightness.

Figure 2:
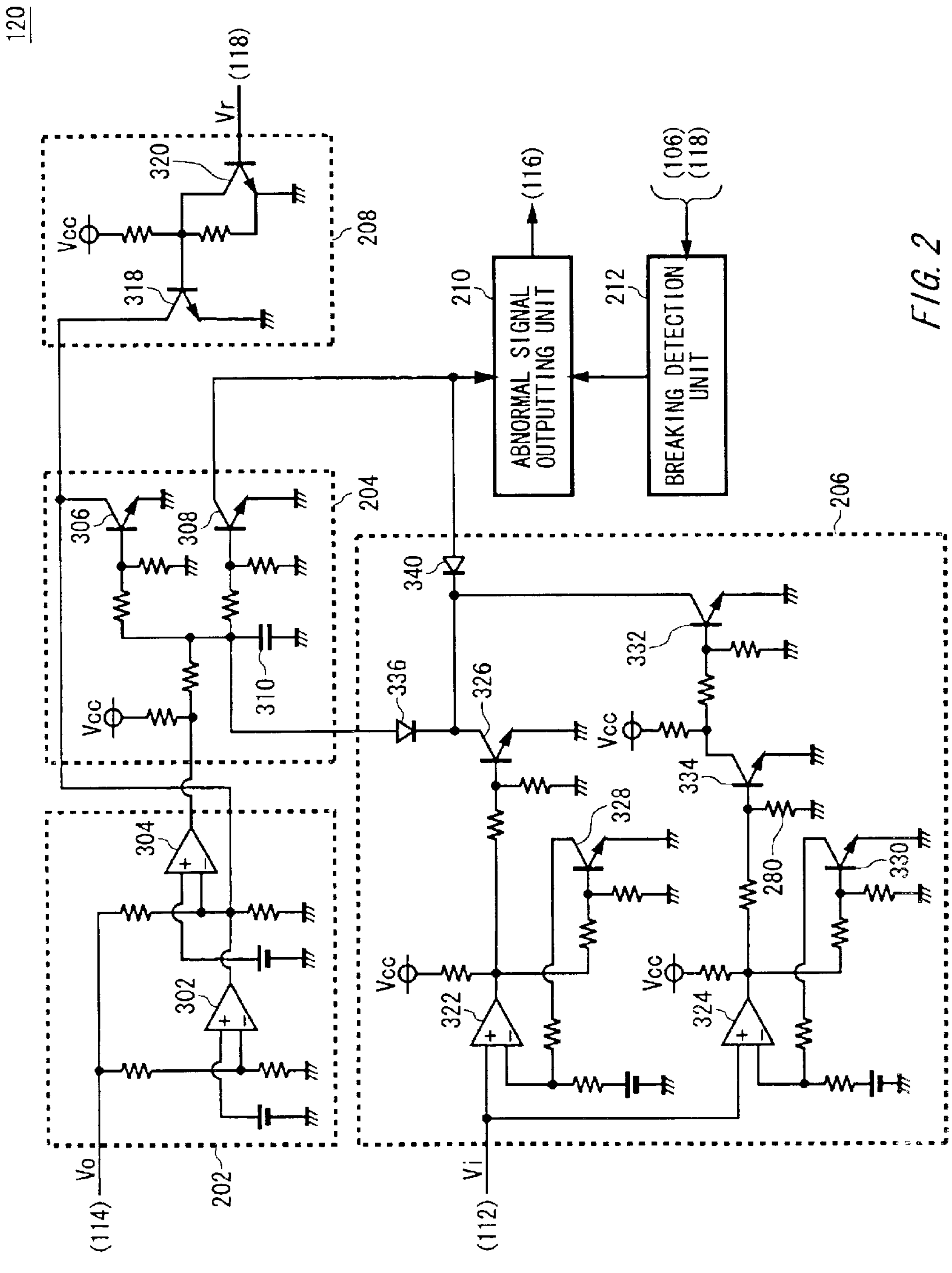
FIG. 2 shows an exemplary circuit structure of an abnormal state detector 120.

FIG. 2 shows an exemplary circuit structure of the abnormal state detector 120. The abnormal state detector 120 includes a breaking detection unit 212, an output voltage monitoring unit 202, a holding unit 204, a supply current monitoring unit 208, a power-supply voltage monitoring unit 206 and an abnormal signal outputting unit 210.

The breaking detection unit 212 detects the breaking of the light-emitting diode 30 (see FIG. 1) connected in series with the resistor 106 based on the voltage across the resistor 106 so as to supply the detection result to the abnormal signal outputting unit 210. Please note that various circuit structures are known for such a circuit for detecting the breaking and therefore the description of the circuit structure of such a circuit is omitted.

The output voltage monitoring unit 202 includes a comparator 302, a comparator 304 and a plurality of resistors. Each of the comparators 302 and 304 keeps its output to have high impedance when a voltage received at its positive input is higher than a voltage received at its negative input, and grounds its output when the voltage at the positive input is lower than the voltage at the negative input. In addition, the comparator 304 supplies its output to the holding unit 204.

Therefore, in a case where the output voltage of the switching regulator 114 exceeded a predetermined upper limit output voltage because of, for example, breakdown of the switching regulator 114 that causes the output of the switching regulator 114 to be open, the comparator 302 grounds the negative input of the comparator 304. In this case, the comparator 304 keeps the impedance at its output high. In another case where the output voltage of the switching regulator 114 became lower than a predetermined lower limit output voltage that is lower than the upper limit output voltage because of, for example, breakdown of the switching regulator 114 such as short-circuit in the output of the switching regulator 114, the comparator 304 keeps the impedance at its output high.

On the other hand, in a case where the switching regulator 114 outputs the output voltage between the lower limit output voltage and upper limit output voltage, the comparator 304 grounds its output. In this manner, the output voltage monitoring unit 202 detects that the output voltage of the switching regulator 114 changes to a voltage higher than the upper limit output voltage or lower than the lower limit output voltage as the abnormal state, and then sends the detection result to the holding unit 204. According to this example, the output voltage monitoring unit 202 can detect the abnormal state based on the output of the switching regulator 114 being open or short-circuited.

The holding unit 204 includes an NPN transistor 308, a capacitor 310, an NPN transistor 306 and a plurality of resistors. When the output voltage monitoring unit 202 has detected the abnormal state of the output voltage of the switching regulator 114, the NPN transistor 308 is turned on so as to allow a collector current to flow, thereby transmitting the fact that the abnormal state was detected to the abnormal signal outputting unit 210.

The capacitor 310 smoothens change of a base voltage of the NPN transistor 308 that is based on the output voltage of the switching regulator 114, thereby preventing malfunction of the NPN transistor 308 in response to a wrong signal having a short duration such as a noise. Also, by the above smoothening by the capacitor 310, the holding unit 204 transmits the detection of the abnormal state to the abnormal signal outputting unit 210 in a case where the output voltage monitoring unit 202 continuously detected the abnormal state of the output of the switching regulator 114 during a predetermined monitoring time or longer.

When the output voltage monitoring unit 202 detected the abnormal state of the output voltage of the switching regulator 114, the NPN transistor 306 is turned on so as to allow a collector current to flow, thereby lowering a potential at the negative input of the comparator 304.

In this manner, the comparator 304 keeps the impedance at its output high irrespective of the output voltage of the switching regulator 114. In other words, the NPN transistor 308 feeds a signal based on the output signal of the output voltage monitoring unit 202 back to the output voltage monitoring unit 202, thereby fixing a value of the signal that is thereafter output by the output voltage monitoring unit 202.

It is preferable that the NPN transistor 306 be turned on prior to the turning-on of the NPN transistor 308 when the output voltage monitoring unit 202 detected the abnormal state. In this case, the holding unit 204 can fix the value of the signal output by the output voltage monitoring unit 202 without fail.

The supply current monitoring unit 208 includes an NPN transistor 320 and an NPN transistor 318. The NPN transistor 320 is turned off when the supply current became lower than a predetermined lower limit current value by receiving a current-detection voltage generated by the resistor 118.

When the NPN transistor 320 was turned off, the NPN transistor 318 is turned on so as to allow a collector current to flow, thereby lowering the negative input of the comparator 304. In this manner, the supply current monitoring unit 208 detects that the supply current becomes lower than the lower limit current value as the abnormal state and transmits the detection of the abnormal state to the abnormal signal outputting unit 210 via the output voltage monitoring unit 202 and the holding unit 204. In this case, the capacitor 310 smoothens voltage change based on the supply current.

The power-supply voltage monitoring unit 206 includes a diode 340, a diode 336, a comparator 322, an NPN transistor 326, an NPN transistor 328, a comparator 324, an NPN transistor 334, an NPN transistor 332, an NPN transistor 330 and a plurality of resistors. The diode 340 supplies the output of the power-supply voltage monitoring unit 206 to the abnormal signal outputting unit 210. The diode 336 discharges the capacitor 310 in a case where the NPN transistor 206 detected the abnormal state of the power-supply voltage.

The comparators 322 and 324 have the same or similar functions as/to that of the comparator 302. The comparator 322 receives a predetermined upper limit power-supply voltage, as a reference voltage. Then, the comparator 322 turns the NPN transistor 326 on in a case where the power-supply voltage became higher than the upper limit power-supply voltage, thereby notifying the abnormal signal outputting unit 210 of the abnormal state of the power-supply voltage. Also in this case, the NPN transistor 328 is turned on so as to allow a collector current to flow, thereby lowering a potential of the reference voltage received by the comparator 322 to a predetermined lowered upper limit voltage.

In this manner, the NPN transistor 328 provides the reference voltage received by the comparator 322 with hysteresis. Thus, during a period from a time at which the power-supply voltage became higher than the upper limit power-supply voltage until the power-supply voltage becomes lower than the lowered upper limit voltage, the comparator 322 fixes its output.

The comparator 324, the NPN transistor 334 and the NPN transistor 330 have the same or similar functions as/to those of the comparator 322, the NPN transistor 326 and the NPN transistor 330. As the reference voltage, the comparator 324 receives the predetermined lower limit power-supply voltage during a period in which the NPN transistor 330 is on and receives an increased lower limit voltage, that is predetermined and higher than the lower limit power-supply voltage, during a period in which the NPN transistor 330 is off. The comparator 324 receives, as the lower limit power-supply voltage, a voltage lower than the upper limit power-supply voltage. The comparator 324 may receive a voltage lower than the lowered upper limit voltage as the increased upper limit voltage.

Moreover, in a case where the power-supply voltage became lower than the lower limit power-supply voltage, the NPN transistor 322 notifies the abnormal signal outputting unit 210 of the abnormal state of the power-supply voltage by being turned on.

In other words, the power-supply voltage monitoring unit 206 detects that the change of the power-supply voltage to a voltage outside a range from the lower limit power-supply voltage to the upper limit power-supply voltage, as the abnormal state. In addition, in a case where the power-supply voltage has changed to a voltage within a normal range from the lowered upper limit voltage and the increased lower limit voltage after the abnormal signal outputting unit 210 detected the abnormal state of the power-supply voltage, the abnormal signal outputting unit 210 stops detecting the abnormal state of the power-supply voltage. Moreover, the output controlling unit 116 may stop the switching regulator 114 in a case where the abnormal state of the power-supply voltage was detected. Furthermore, in a case where the detection of that abnormal state was stopped, the output controlling unit 116 may resume the switching regulator 114.

Here, a case is considered where, when the output voltage of the switching regulator 114 became lower in response to the stop of the switching regulator 114, the output voltage monitoring unit 202 detects that lowering of the output voltage as the abnormal state. In this case, the holding unit 204 fixes the output of the output voltage monitoring unit 202. However, in this case, even if the power-supply voltage returns to a voltage in the normal range, the switching regulator 114 does not operate again.

On the other hand, according to this example, in a case where the abnormal state of the power-supply voltage was detected, the diode 336 discharges the capacitor 310. Therefore, the holding unit 204 does not fix the output of the output voltage monitoring unit 202. Thus, according to this example, the output controlling unit 116 can resume the switching regulator 114 in response to return of the power-supply voltage to the normal range.

In addition, when the switching regulator 114 stopped, the switching regulator 114 sometimes receives the power-supply voltage that fluctuates because of the impedance of wiring. Also, in accordance with the fluctuation of the power-supply voltage, the power-supply voltage monitoring unit 206 sometimes stops detecting the abnormal state of the power-supply voltage. In this case, the output controlling unit 116 repeats the stop and restart of the operation of the switching regulator 114 at a short period in order to restart the switching regulator 114. However, the power-supply voltage monitoring unit 206 detects the abnormal state of the power-supply voltage based on a threshold voltage having hysteresis. Therefore, according to this example, it is possible to stably control the switching regulator 114.

In an alternative example, the comparator 322 may receive a voltage equal to the upper limit power-supply voltage, as the lowered upper limit voltage, while the comparator 324 may receive a voltage equal to the lower limit power-supply voltage as the increased upper limit voltage. In this case, the power-supply voltage monitoring unit 206 detects the abnormal state of the power-supply voltage based on a threshold voltage having no hysteresis. The output controlling unit 116 may stop and resume the switching regulator 114 repeatedly at a short period in accordance with the fluctuation of the power-supply voltage caused by the impedance of the wiring, thereby blinking the light-emitting diode 30 at that short period. In this case, the abnormal state detector 120 can notify the user of the abnormal state of the DC power supply 112 by that blinking of the light-emitting diode 30.

The abnormal signal outputting unit 210 supplies information indicating the abnormal state when any of the breaking detection unit 212, the output voltage monitoring unit 202, the supply current monitoring unit 208 and the power-supply voltage monitoring unit 206 has detected the abnormal state. According to this example, it is possible to appropriately detect the abnormal state of the vehicular lamp 10 (see FIG. 1). Moreover, it is possible to appropriately control the switching regulator 114 in accordance with the detection result of the abnormal state.

In this example, the capacitor 310 smoothens change of a voltage based on the output voltage of the switching regulator 114 or the supply current. In an alternative example, the capacitor 310 may smoothen change of a voltage based on the power-supply voltage. The abnormal state detector 120 may detect the abnormal state based on the thus smoothened voltage. In this case, it is possible to prevent the fluctuation in the above-mentioned voltages caused by the noise, for example, from wrongly being detected as the abnormal state.

In another example, the abnormal state detector 120 may include only one of the output voltage monitoring unit 202, the supply current monitoring unit 208, the power-supply voltage monitoring unit 206 and the breaking detection unit 212, instead of all of the units 202, 208, 206 and 212. In this case, the number of parts of the abnormal state detector 120 can be reduced and it is therefore possible to provide the vehicular lamp 10 at a reduced cost.

For example, the abnormal state detector 120 may have a structure in which the supply current monitoring unit 208, the power-supply voltage monitoring unit 206 and the breaking detection unit 212 are omitted in the structure shown in FIG. 2 or a structure in which the output voltage monitoring unit 202, the supply current monitoring unit 208, the holding unit 204 and the breaking detection unit 212 are omitted in the structure shown in FIG. 2.

Moreover, the abnormal state detector 120 may have a structure in which the output voltage monitoring unit 202, the power-supply voltage monitoring unit 206 and the breaking detection unit 212 are omitted in the structure shown in FIG. 2. In this case, the holding unit 204 may have a structure in which a part other than a part including the comparator 304 and the associated structure for supplying inputs to the comparator 304 is omitted in the structure shown in FIG. 2.

In still another example, the abnormal state detector 120 may include two or three of the output voltage monitoring unit 202, the supply current monitoring unit 208, the power-supply voltage monitoring unit 206 and the braking detection unit 212, instead of all of these units. According to this example, it is possible to provide the vehicular lamp 10 including a combination of necessary monitoring functions.

Figure 3A:
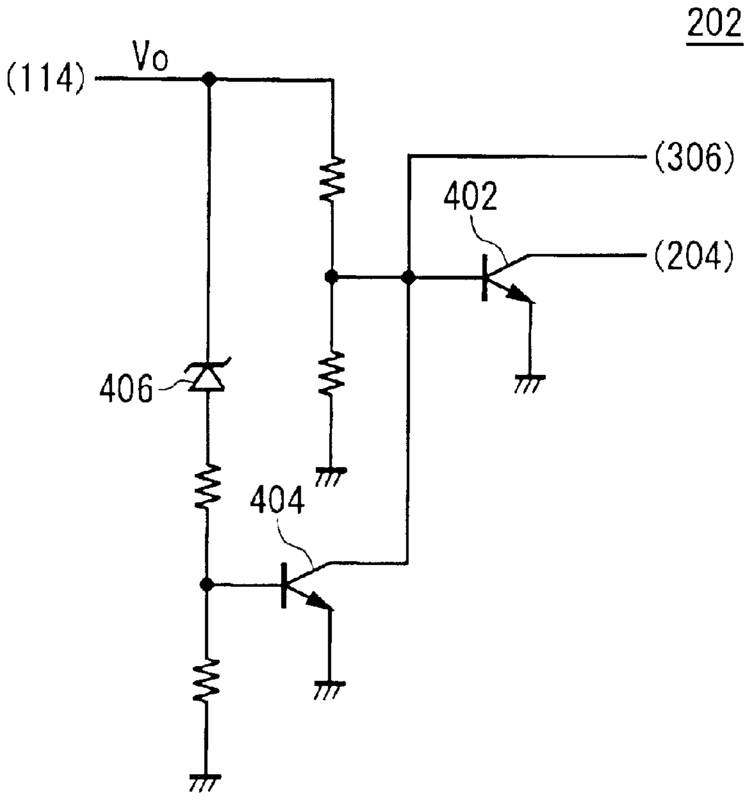
FIGS. 3A and 3B show other exemplary circuit structures of an output voltage monitoring unit 202.

FIG. 3A shows another exemplary circuit structure of the output voltage monitoring unit 202. In this example, the output voltage monitoring unit 202 includes an NPN transistor 402, an NPN transistor 404, a Zener diode 406 and a plurality of resistors.

In a case where the output voltage of the switching regulator 114 became lower than a predetermined lower limit output voltage, the NPN transistor 402 is turned off, thereby transmitting the abnormal state of the output voltage of the switching regulator 114 to the holding unit 204. In a case where the output voltage of the switching regulator 114 became higher than a predetermined upper limit output voltage, a current flows in the Zener diode 406, so as to turn the NPN transistor 404 on. In this case, the NPN transistor 404 turns the NPN transistor 402 off so as to transmit the abnormal state of the output voltage of the switching regulator 114 to the holding unit 204. According to this example, the output voltage monitoring unit 202 can appropriately detect the abnormal state of the output voltage of the switching regulator.

A base terminal of the NPN transistor 402 is electrically connected to a collector terminal of the NPN transistor 306. Therefore, when the output voltage monitoring unit 202 detected the abnormal state, the holding unit 204 fixes the output of the output voltage monitoring unit 202.

Figure 3B:
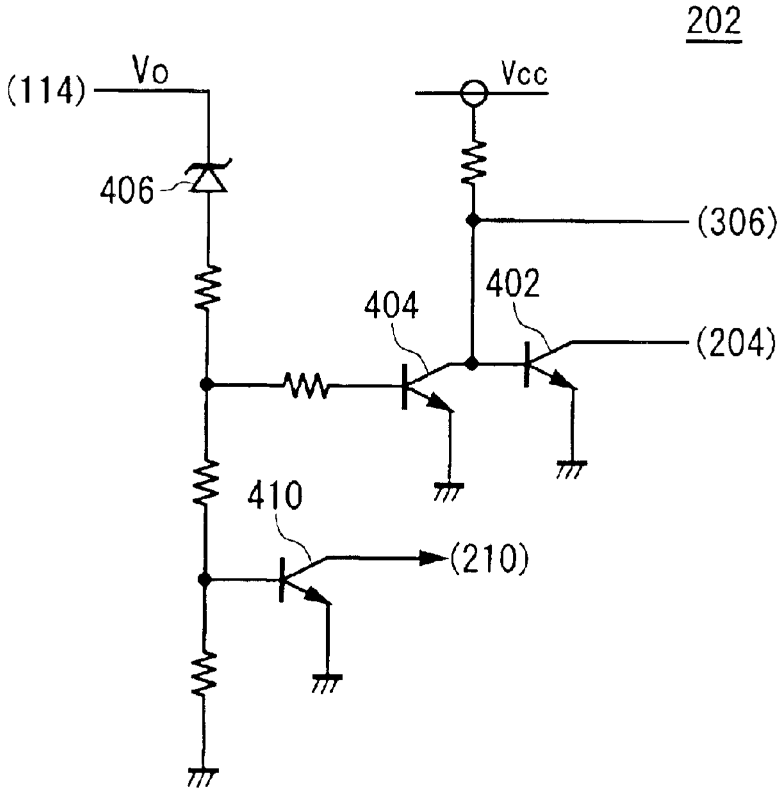

FIG. 3B shows still another example of the circuit structure of the output voltage monitoring unit 202. In this example, the voltage output monitoring unit 202 includes an NPN transistor 402, an NPN transistor 404, a Zener diode 406, an NPN transistor 410 and a plurality of resistors. In FIG. 3B, the components labeled with the same reference numerals as those in FIG. 3A have the same or similar functions as/to the corresponding components in FIG. 3A, and therefore the description thereof is omitted. In this example, a base terminal of the NPN transistor 402 is connected to a pull-up resistor. The NPN transistor 402 is turned on when the NPN transistor 404 is off.

A base terminal of the NPN transistor 410 receives the output voltage of the switching regulator 114 in the downstream of the NPN transistor 404, via the Zener diode 406 and the resistors. In this case, the base terminal of the NPN transistor 410 receives a voltage lower than the base voltage of the NPN transistor 306. Thus, the NPN transistor 410 detects that the output voltage of the switching regulator 114 becomes higher than a stop voltage that is still higher than the upper limit output voltage as the abnormal state. In this case, it is possible to appropriately detect excessive increase of the output voltage of the switching regulator 114.

In this example, a collector terminal of the NPN transistor 410 is electrically connected to the abnormal signal outputting unit 210 without involving the NPN transistor 404. Therefore, in this example, when the NPN transistor 410 has been turned on, the output controlling unit 116 (see FIG. 1)

immediately stops the output of the switching regulator 114. In this case, it is possible to prevent further increase of the output voltage of the switching regulator 114 after the abnormal state was detected. According to this example, the output voltage monitoring unit 202 can appropriately detect the abnormal state of the output voltage of the switching regulator.

The NPN transistor 410 is turned on when the output voltage of the switching regulator 114 exceeded, for example, 60V. In this case, the vehicular lamp 10 can be operated safely.

Figure 4:
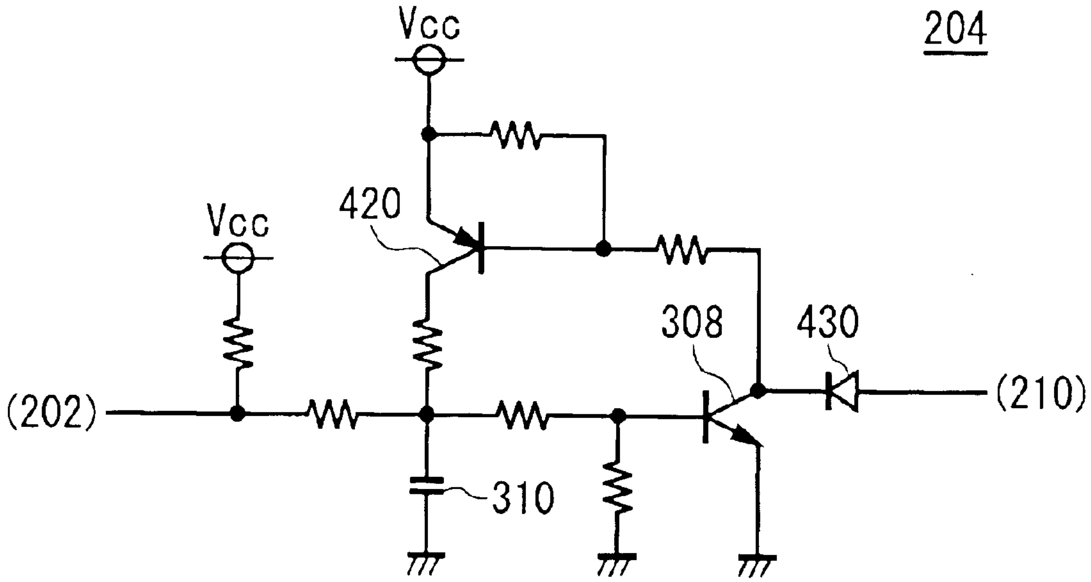
FIG. 4 shows another exemplary circuit structure of a holding unit 204.

FIG. 4 shows another exemplary circuit structure of the holding unit 204. In this example, the holding unit 204 includes an NPN transistor 308, a capacitor 310, a diode 430, a PNP transistor 420 and a plurality of resistors. In FIG. 4, the components labeled with the same reference numerals as those in FIG. 2 have the same or similar functions as/to those of the corresponding components in FIG. 2 and therefore the description thereof is omitted.

When the NPN transistor 308 has been turned on in accordance with the output of the output voltage monitoring unit 202, the PNP transistor 420 is turned on, thereby increasing a base voltage of the NPN transistor 308 so as to keep the NPN transistor 308 on. In this manner, the holding unit 204 fixes a value of a signal output from the NPN transistor 308. Therefore, according to this example, in a case where the output voltage monitoring unit 202 detected the abnormal state, the holding unit 204 continuously supplies a signal indicating that the abnormal state was detected to the abnormal signal outputting unit 210.

Figure 5:
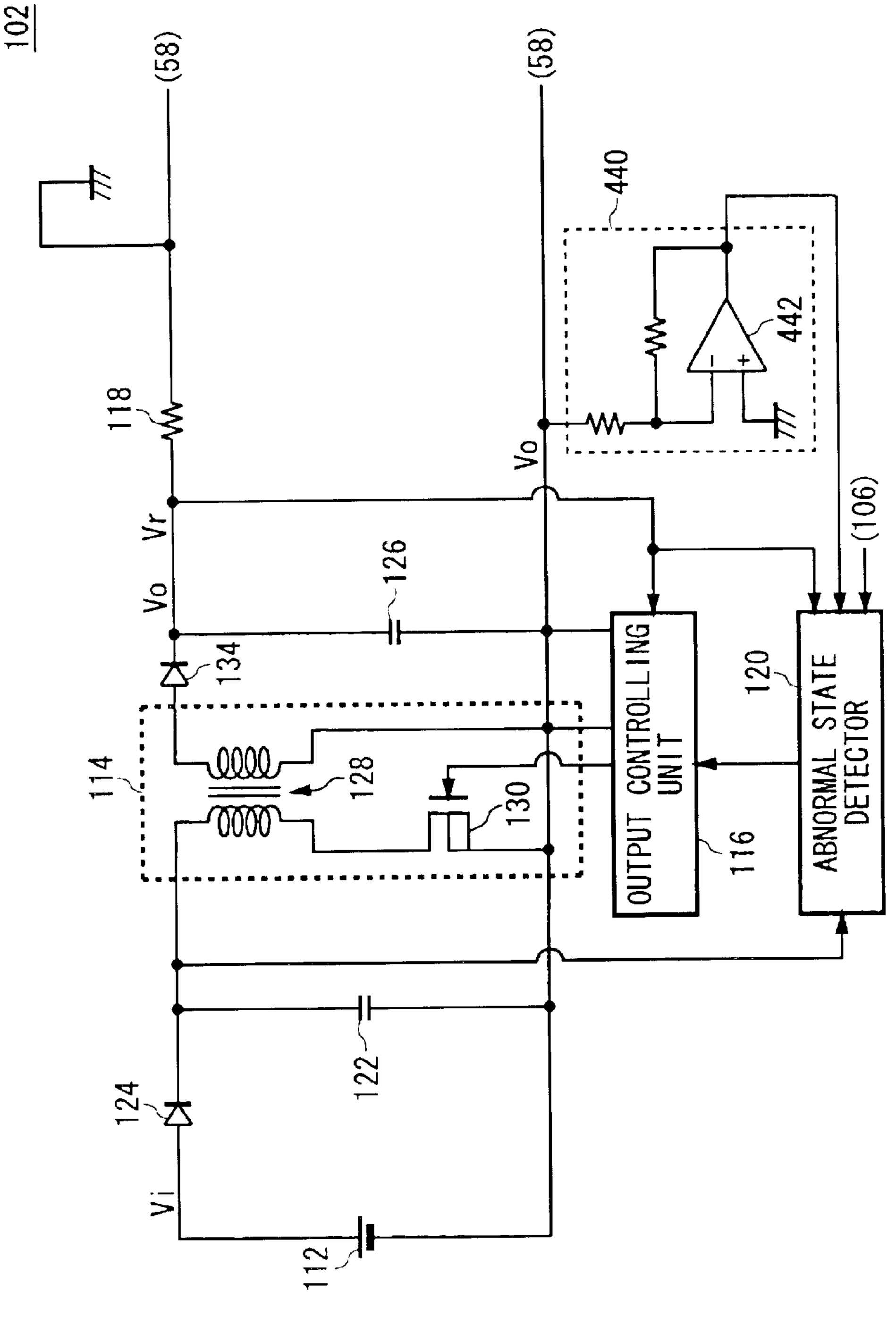
FIG. 5 shows another exemplary circuit structure of a lighting circuit 102.

FIG. 5 shows another exemplary circuit structure of the lighting circuit 102. In FIG. 5, the components labeled with the same reference numerals as those in FIG. 1 have the same or similar functions as/to those of the corresponding components in FIG. 1 and therefore the description thereof is omitted. In this example, the transformer 128 outputs a negative voltage from the lower-voltage output end of the secondary coil by being grounded at the higher-voltage output end of the secondary coil via the resistor 118.

Thus, in this example, the lighting circuit 102 further includes an inverting unit 440. The inverting unit 440 inverts the sign of the output voltage of the switching regulator 114 received from the lower-voltage output end of the secondary coil of the transformer 128, and then supplies that output voltage having the inverted sign to the abnormal state detector 120. The inverting unit 440 may supply that output voltage having the inverted sign to the output voltage monitoring unit 202. In this case, the abnormal state detector 120 can appropriately detect the abnormal state of the output voltage of the switching regulator 114.

In this example, the inverting unit 440 includes an operational amplifier 442 in which a positive input is grounded and an output is fed back to a negative input. The operational amplifier 442 receives the output voltage of the switching regulator 114 via a resistor at its negative input and supplies its output to the abnormal state detector 120.

Figure 6:
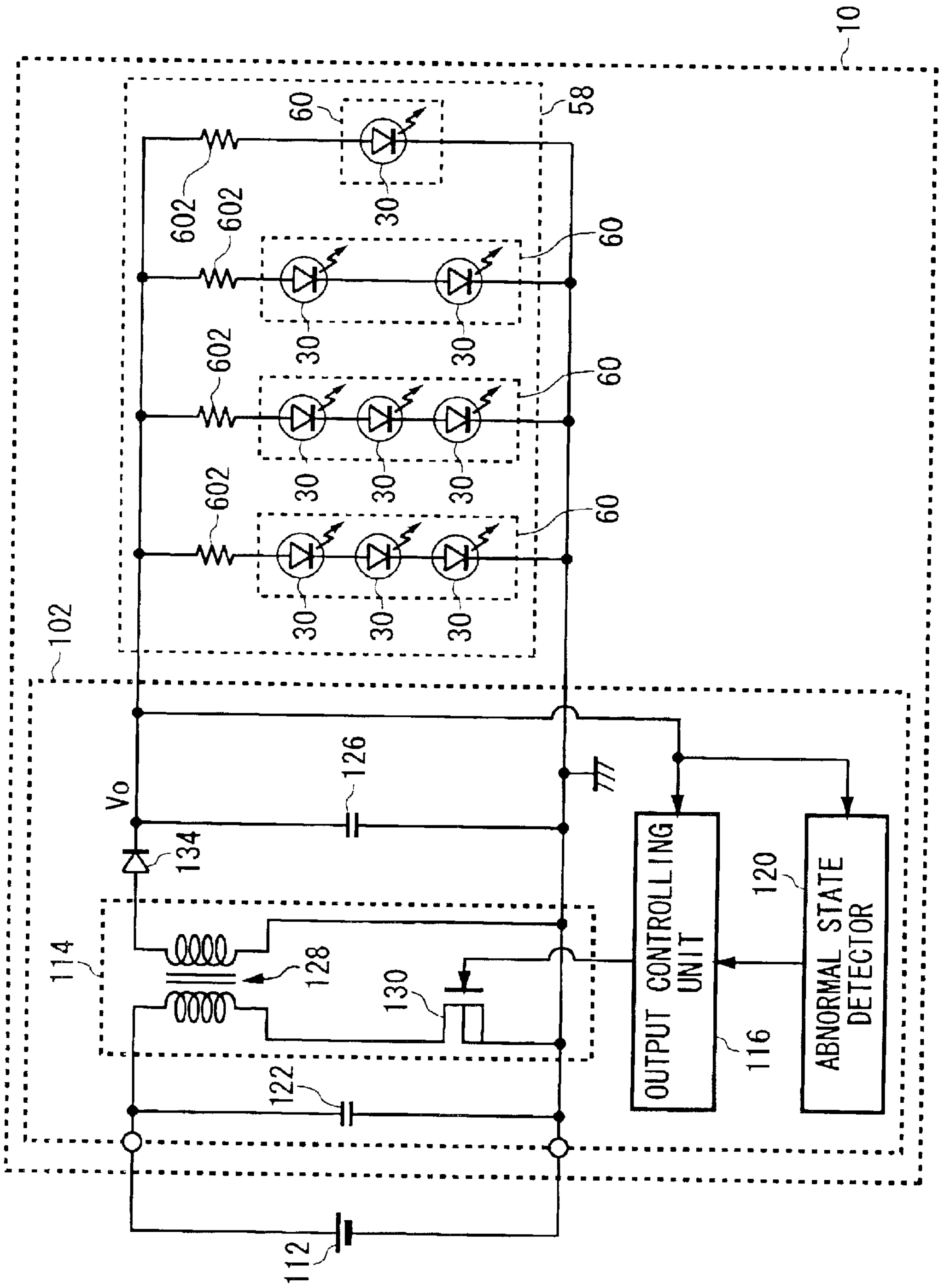
FIG. 6 shows another exemplary circuit structure of the vehicular lamp 10.

FIG. 6 shows another exemplary circuit structure of the vehicular lamp 10. In this example, the output controlling unit 116 controls the NMOS transistor 130 based on the output voltage of the switching regulator 114, thereby making the switching regulator 114 output a predetermined voltage. Moreover, the abnormal state detector 120 detects the abnormal state of the output voltage of the switching regulator 114. Thus, also in this example, it is possible to light the light-emitting diode 30 safely.

The light source block 58 includes a plurality of light source units 60 and resistors 602 respectively connected in series with the associated light source units 60. In this example, the number of the light-emitting diodes 30 included in each of one or more of the light source units 60 is different from that in each of the other light source units 60. Moreover, at least one of the light source units 60 include light-emitting diodes 30 having different color from those included in the other light source units 60. Therefore, in this example, the sum of voltage drop in the forward direction of the light-emitting diodes 30 because of light emission (hereinafter, referred to as forward-direction voltage sum) is larger in each of one or more light source units 60 than that in each of the other light source units 60.

The resistor 602 supplies the output voltage of the switching regulator 114 and a current in accordance with the forward-direction voltage sum in the associated light source unit 60 to the associated light source unit 60. The resistors 602 may have different resistance values. In this case, each resistor 602 can supply an appropriate amount of current to the associated light source unit 60.

The output controlling unit 116 makes the switching regulator 114 output a voltage higher than the forward-direction voltage sum in any of the light source units 60. Therefore, according to this example, it is possible to appropriate light all the light-emitting diodes 30. Except for the above, the structure shown in FIG. 6 has the same or similar functions as/to that of the structure shown in FIG. 1 and therefore the description thereof is omitted.

Figure 7A:
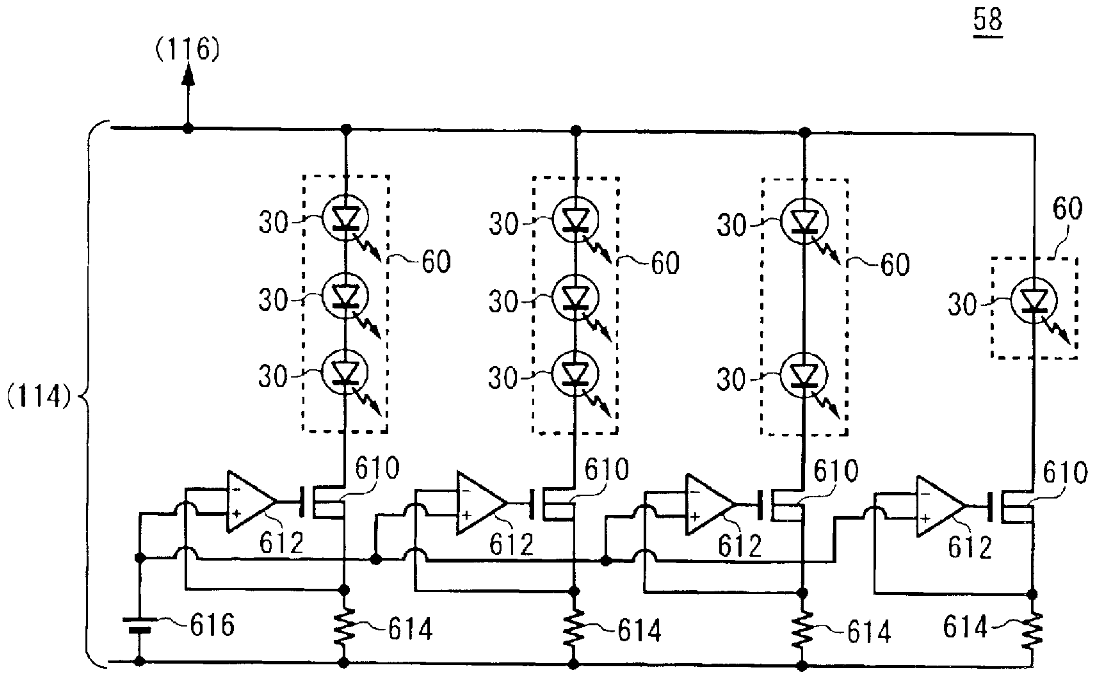
FIG. 7A shows another exemplary circuit structure of a light source block 58.

FIG. 7A shows another exemplary circuit structure of the light source block 58 in FIG. 6. In FIG. 7A, the components labeled with the same reference numerals as those in FIG. 6 have the same or similar functions as/to those of the components in FIG. 6 and therefore the description thereof is omitted. In this example, the light source block 58 includes, for each of the light source units 60, an NMOS transistor 610, an operational amplifier 612 and a resistor 614, in place of the resistor 602.

The NMOS transistor 610 is connected in the downstream of the associated light source unit 60 in series and controls a current flowing in the associated light source unit 60 in accordance with a voltage received at its gate terminal. The resistor 614 is connected to the light source unit 60 and NMOS transistor 610 that are associated therewith in series and generates a voltage in accordance with the current flowing in the light source unit 60.

The operational amplifier 612 receives a predetermined constant voltage at its positive input and the voltage generated by the resistor 614 at its negative input, and supplies its output to a gate terminal of the NMOS transistor 610. Thus, the operational amplifier 612 keeps the current value of the current flowing in the associated light source unit 60 to a predetermined current value. In this case, it is possible to light the light-emitting diodes 30 further appropriately.

Figure 7B:
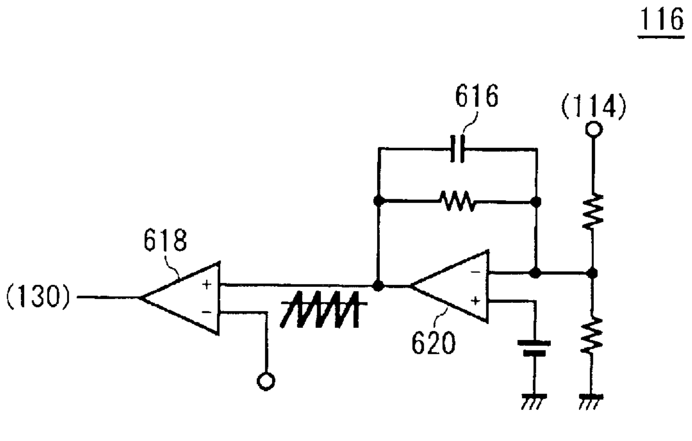
FIG. 7B shows an exemplary circuit structure of an output controlling unit 116.

FIG. 7B shows an exemplary circuit structure of the output controlling unit 116 in this example. The output controlling unit 116 includes an operational amplifier 620, a comparator 618, a capacitor 616 and a plurality of resistors.

For the operational amplifier 620, a negative feed-back is formed. The operational amplifier 620 compares the output voltage of the switching regulator 114 divided by a plurality of resistors, that is received at its negative input, with a predetermined constant voltage received at its positive input and then outputs the comparison result to a positive input of the comparator 618. The comparator 618 compares the output of the operational amplifier 620 with a predetermined saw-tooth wave voltage received at its negative input and then supplies the comparison result to the gate terminal of the NMOS transistor 130 so as to control the NMOS transistor 130.

Please note that the capacitor 616 is a capacitor for phase compensation of the operational amplifier 620 and prevents oscillation of the operational amplifier 620. Moreover, as a circuit for generating the saw-tooth wave voltage, various circuits are known. Therefore, the description of such a circuit is omitted. According to this example, the switching regulator 114 can be appropriately controlled.

FIG. 8A shows another exemplary circuit structure of the light source block 58 in FIG. 6. In FIG. 8A, the components labeled with the same reference numerals as those in FIG. 7A have the same or similar functions as/to those of the corresponding components in FIG. 7A and therefore the description thereof is omitted. In this example, the output controlling unit 116 receives output voltages of a plurality of operational amplifiers 612, instead of the output voltage of the switching regulator 114, and controls the switching regulator 114 based on the received voltages.

FIG. 8B shows an exemplary circuit structure of the output controlling unit 116 corresponding to the light source block 58 shown in FIG. 8A. In this example, the output controlling unit 116 includes a plurality of diodes 622, an operational amplifier 620, a comparator 618, a capacitor 616 and a plurality of resistors. The diodes 622 are provided to correspond to a plurality of operational amplifiers 612, respectively. Each diode 622 supplies the output of the corresponding operational amplifier 612 to a positive input of the operational amplifier 620.

A negative input of the operational amplifier 620 is electrically connected to a constant voltage supply via a resistor. For the operational amplifier 620, negative feedback is formed. The operational amplifier 620 compares the outputs of the operational amplifiers 612 received at its positive input with received at its negative input and outputs the comparison result to the comparator 618. Except of the above, the structure shown in FIG. 8B has the same or similar functions as/to those in the structure shown in FIG. 7B and therefore the description thereof is omitted.

In this example, in a case where a current flowing in any of a plurality of light source units 60 is smaller than a predetermined current value, the output controlling unit 116 controls the gate voltage of the NMOS transistor 130 so as to make the output voltage of the switching regulator 114 higher. Therefore, according to this example, the switching regulator 114 can be controlled appropriately.

Figure 9:
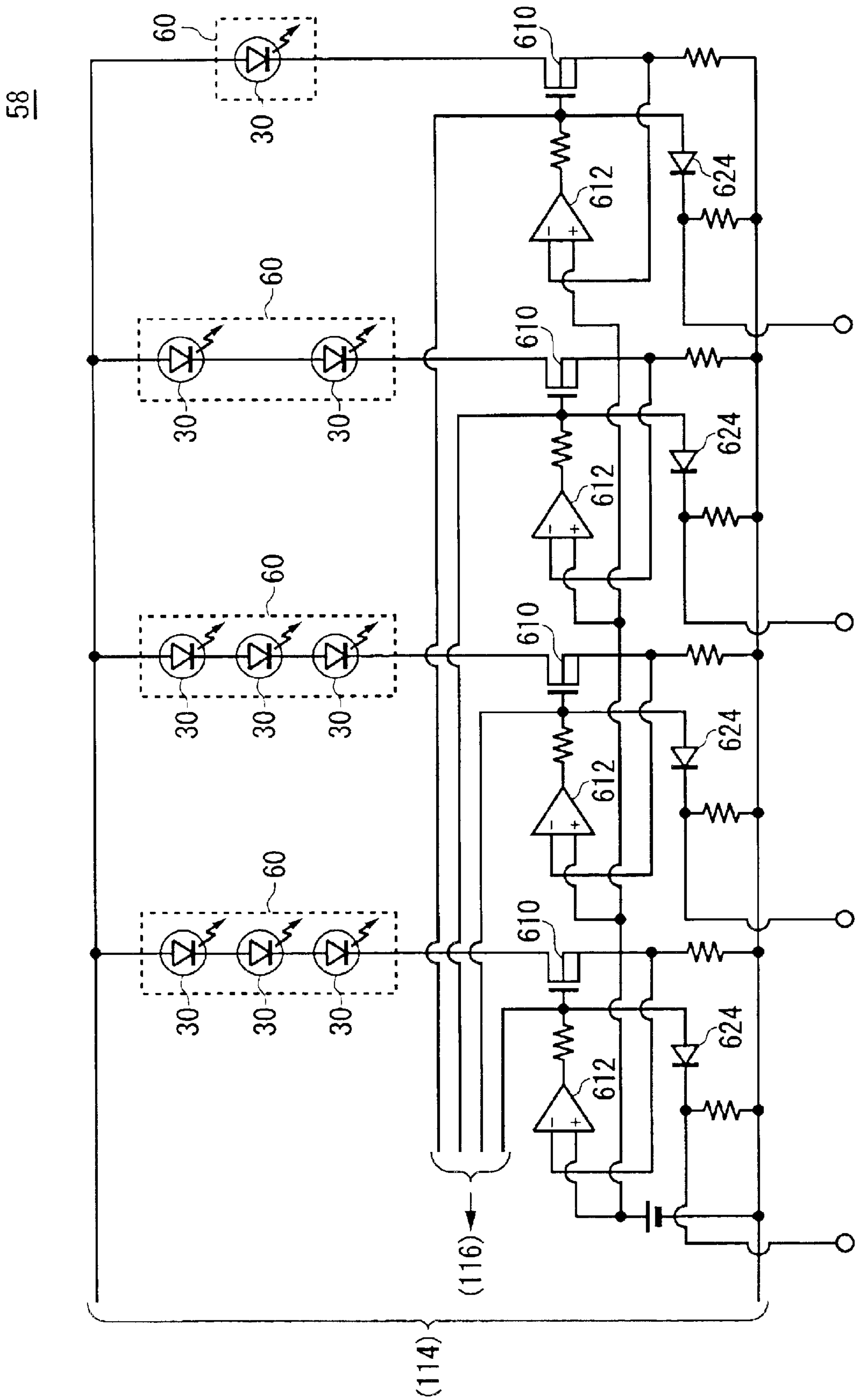
FIG. 9 shows still another exemplary circuit structure of the output controlling unit 116.

FIG. 9 shows still another example of the circuit structure of the light source block 58 in FIG. 6. In FIG. 9, the components labeled with the same reference numerals as those in FIG. 8A have the same or similar functions as/to those of the corresponding components in FIG. 8A and therefore the description thereof is omitted.

In this example, the light source block 58 further includes a plurality of diodes 624 respectively provided to correspond to a plurality of light source units 60. An anode of the diode 624 is electrically connected to the gate terminal of the corresponding NMOS transistor 610, while a cathode thereof receives a selection signal that is an instruction from the outside of the light source block 58.

In a case where the diode 624 received Low signal as the selection signal, the gate voltage of the corresponding NMOS transistor 610 is grounded via the diode 624 and that NMOS transistor 610 is turned off. Therefore, the light-emitting diode 30 included in the light source unit 60 connected to that NMOS transistor 610 in series is not turned on. On the other hand, in a case where the diode 624 receives High signal as the selection signal, the diode 624 allows no current to flow. Therefore, the corresponding NMOS transistor 610 allows a predetermined current to flow.

In this example, the operational amplifier 612 supplies its output voltage to the gate terminal of the corresponding NMOS transistor 610 via a resistor. Moreover, the cathode of the diode 624 is grounded via a resistor. In this case, it is possible to place the light source unit 60 in a non-selected state in an appropriate manner in accordance with the selection signal, irrespective of the output of the operational amplifier 612. According to this example, based on the instruction from the outside of the vehicular lamp 10, it is possible to selectively light the light-emitting diodes 30.

As is apparent from the above description, according to the present invention, it is possible to light a light source for a vehicular lamp safely.

Although the present invention has been described by way of exemplary embodiments, it should be understood that those skilled in the art might make many changes and substitutions without departing from the spirit and the scope of the present invention which is defined only by the appended claims.

What is claimed is:

1. A lighting circuit for lighting a vehicular lamp including a light-emitting diode, comprising:

a switching regulator operable to apply an output voltage based on a power-supply voltage received from a DC power supply provided in an outside thereof, to said light-emitting diode to supply a supply current to said light-emitting diode;

an abnormal state detector operable to detect an abnormal state of said lighting circuit based on at least one of said output voltage of said switching regulator, said supply current and said power-supply voltage; and an output controlling unit operable to control said output voltage of said switching regulator based on said supply current or said output voltage of said switching regulator and to lower said output voltage of said switching regulator in a case where said abnormal state detector detected said abnormal state.

2. A lighting circuit as claimed in claim 1, wherein said vehicular lamp includes n light-emitting diodes connected in parallel, where n is integer equal to or larger than 2, said abnormal state detector detects breaking of at least one of said n light-emitting diodes as said abnormal state, and said output controlling unit lowers said output voltage of said switching regulator in a case where said abnormal state detector detected said abnormal state, to reduce said supply current to approximately (n−1)/n times.

3. A lighting circuit as claimed in claim 1, wherein said output controlling unit stops said switching regulator in a case where said abnormal state detector detected said abnormal state.

4. A lighting circuit as claimed in claim 1, wherein said abnormal state detector detects that said output voltage of said switching regulator becomes higher than a predetermined voltage as said abnormal state.

5. A lighting circuit as claimed in claim 1, wherein said abnormal state detector detects that said power-supply voltage changes to a voltage outside a predetermined region as said abnormal state, and said output controlling unit stops said switching regulator in a case where said abnormal state was detected and resumes said switching regulator in a case where the detection of said abnormal state was stopped.

6. A lighting circuit as claimed in claim 1, further comprising a smoothening capacitor operable to smoothen change of a voltage that is based on at least one of said output voltage of said switching regulator, said supply current and said power-supply voltage, wherein said abnormal state detector detects said abnormal state based on said smoothened voltage.

* * * * *